United States Patent [19]
Escribano Nevado et al.

[11] 3,887,693
[45] June 3, 1975

[54] CONTINUOUS PROCESS FOR OBTAINING ALUMINIUM FLUORIDE BY REACTING FLUOSILICIC ACID WITH AN ALUMINOUS MATERIAL

[75] Inventors: Antonio Escribano Nevado, Bilbao/Vizcaya; Eduardo Chapela Lago, Castro Urdiales/Santander; Jesus Gutierrez Hernandez, Algorta/Vizcaya, all of Spain

[73] Assignee: Derivados del Fluor, S.A., Spain

[22] Filed: May 25, 1973

[21] Appl. No.: 363,872

[30] Foreign Application Priority Data
May 26, 1972   Spain .................................... 403234
May 8, 1973   Spain .................................... 414546

[52] U.S. Cl. ................ 423/489; 423/126; 423/339; 423/495; 423/659; 23/305; 23/260
[51] Int. Cl. .......................... C01f 7/50; C01b 33/12
[58] Field of Search .......... 423/126, 489, 339, 495, 423/659; 23/305

[56] References Cited
UNITED STATES PATENTS
| | | | |
|---|---|---|---|
| 2,527,340 | 10/1950 | Taylor | 423/423 |
| 2,664,341 | 12/1953 | Kesting | 423/478 |
| 2,842,426 | 7/1958 | Glocker | 423/126 |
| 2,920,938 | 1/1960 | Matoush | 423/126 |
| 2,958,575 | 11/1960 | Allen | 423/489 |
| 3,057,681 | 10/1962 | Gernes et al. | 423/489 |
| 3,175,882 | 3/1965 | Derr | 423/126 X |
| 3,492,086 | 1/1970 | Ve et al. | 423/489 |

FOREIGN PATENTS OR APPLICATIONS
| | | | |
|---|---|---|---|
| 656,374 | 8/1951 | United Kingdom | 423/489 |
| 782,423 | 9/1957 | United Kingdom | 423/495 |

*Primary Examiner*—Edward Stern
*Attorney, Agent, or Firm*—Wenderoth, Lind & Ponack

[57] ABSTRACT

The present invention relates to a continuous process for preparing aluminium fluoride by reacting fluosilicic acid (substantially pure) obtained from superphosphate, phosphoric acid or hydrofluoric acid industries, having a maximum $P_2O_5$ content of 250 ppm and an aluminous material, preferably alumina or bauxite hydrate.

12 Claims, 1 Drawing Figure

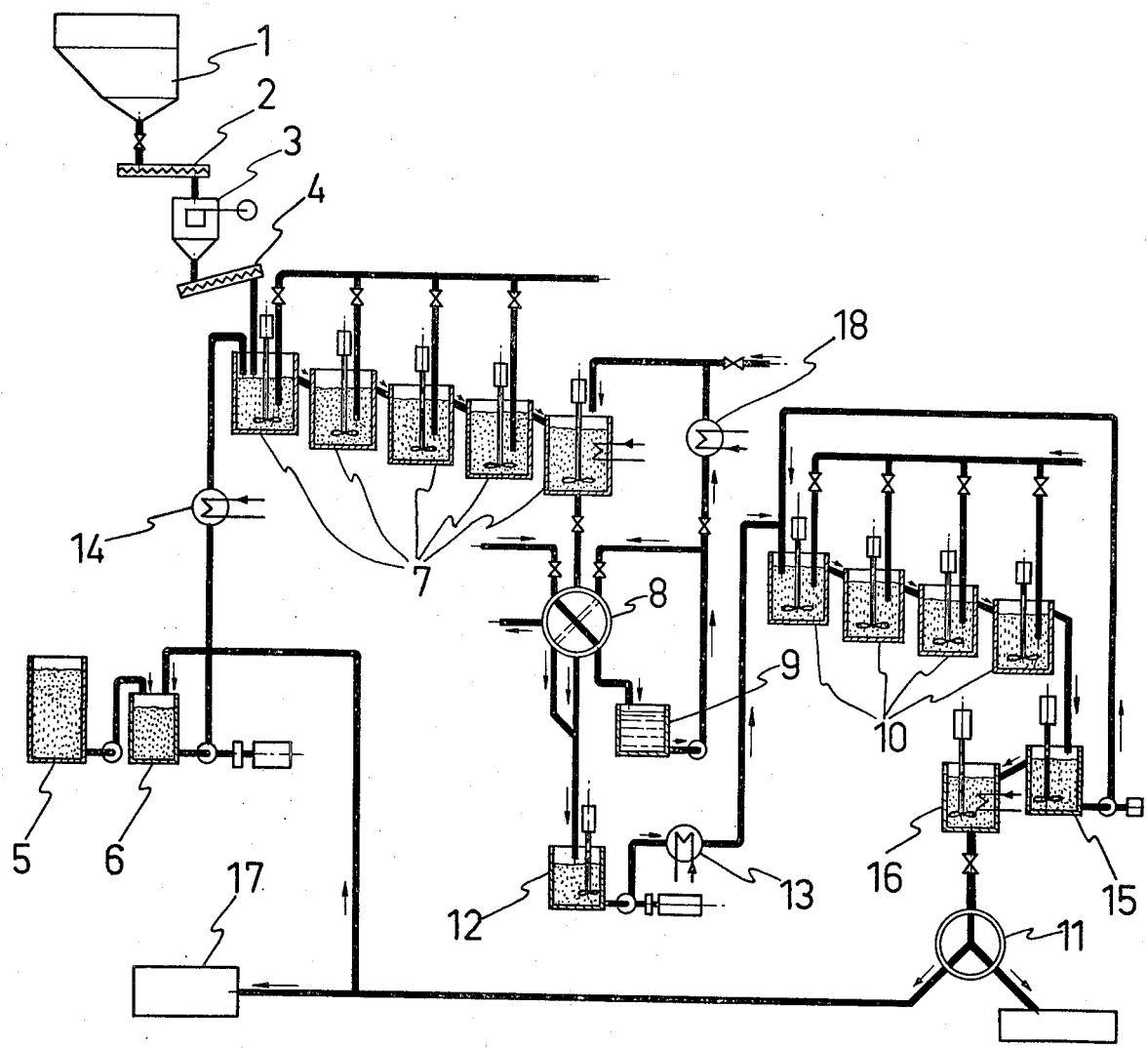

CONTINUOUS PROCESS FOR OBTAINING ALUMINIUM FLUORIDE BY REACTING FLUOSILICIC ACID WITH AN ALUMINOUS MATERIAL

Conventional methods of obtaining aluminium fluoride involve the reaction of hydrofluoric acid with aluminum hydroxide. This reaction could be effected by a dry process, using anhydrous hydrofluoric acid gas on an alumina bed (fluid bed), or by a wet process by reaction of hydrofluoric acid, at various concentrations, with alumina hydrate.

The drawbacks of such conventional methods mainly reside in the evergrowing scarcity of fluorspar, which is the starting material for obtaining hydrofluoric acid. The high cost which said fluorspar is acquiring, makes processes for manufacturing aluminium fluoride less attractive economically. Due to the fact that industries dedicated to the manufacture of phosphoric acid, superphosphates and hydrofluoric acid obtain fluosilicic acid as a by-product; that the amount of acid obtained is rather large, due to the size of the superphosphate industries, and that there are recovery processes which lead to the obtention of sufficiently pure fluosilicic acid, the use of fluosilicic acid in the preparation of aluminium flouride is of ever growing interest, both economically as well as from a pollution point of view, since, in this way, said by-product is revalued when used as a raw material in the process for obtaining aluminium fluoride and, likewise, problems concerning its evacuation, faced by the mentioned superphosphate, phosphoric acid and hydrofluoric acid industries, are avoided.

Consequently, and in this type of industry, the primary idea has recently been to find a process for obtaining aluminium fluoride whereby said by-product can be used.

In effect, under these conditions, i.e. the utilization of fluosilicic acid for obtaining a flux by industrially profitable processes, the chemical industry has constantly evolutioned and has discovered various processes (some of them even protected by patents). However, in fact, only a few of such processes have definitely succeeded in industrial practice due to the drawbacks presented in some cases and due to the fact that many of these processes are only laboratory studies whose application to this industry is complex. On the other hand, all presently known and used processes for obtaining aluminium fluoride which employ fluosilicic acid as well as an aluminous material as raw materials, are characterized in that the reaction is carried out batchwise in a single reactor.

Precisely, with a view to setting out in detail the steps carried out in processes for obtaining aluminium fluoride, we shall make reference, although only briefly, to the most evolutioned processes which, based on the reaction of a fluorized acid and an aluminous material, obtain aluminium fluoride with varying raw materials or reaction conditions.

Thus, West German Pat. No. 1,013,267 and U.S. Pat. No. 2,842,426 describe a process wherein bauxite or alumina hydrate are used as the aluminium salt, having silica as the impurity, which when reacted with a 20% fluosilic acid at a temperature ranging between 38° and 88°C for 20 to 40 minutes, yields a solution of $AlF_3$ which is separated by filtering the silica suspension. These processes are, of course, batchwise and the reaction is carried out in a single reaction.

French Pat. No. 1,130,629 and German Pat. No. F 18337/IVa, describe another process, wherein 5 to 15% fluosilic acid is reacted with an aqueous suspension of alumina hydrate, whereby the acid concentration is even more diluted. The reaction temperature is from 80° to 100°C and when the pH of the filtrate is adjusted to 2–3, the maximum solubility conditions are obtained. Furthermore, an excess of alumina hydrate over the Stoichiometric amount, can be used, thus allowing for the temperature to be reduced to about 60°–75°C. Logically, this process is not very profitable, since such a diluted fluosilicic acid should be used and the critical conditions of filtration and reaction of the process should be adjusted. Needless to say, the process is batchwise.

The same occurs in East German Pat. No. 59,281, Swiss Pat. No. 473,063, British Pat. No. 1,074,665 and Austrian Pat. No. 259,522 (the latter was subsequently extended to other countries). Since the process is batchwise, metering the alumina hydrate in a matter of a minute, maintaining the boiling temperature of the reaction mixture for approximately 5 to 15 minutes and feeding from 95–100% of the Stoichiometric amount of alumina hydrate become industrially troublesome. Besides, a possible faulty adjustment of the reactants implies serious problems in the filtration of the silica.

Likewise, West German Pat. No. 2,022,574 deals with a process of crystallization under pressure from a solution of aluminium fluoride. This process is similar to that of Austrian Pat. No. 243,762 wherein the solution of aluminium fluoride to be crystallized is seeded by recycling a certain amount of crystals having a specific size distribution.

On the other hand, the aluminous material to be used in the process is the object of various patents. Thus, West German Pat. No. 1,767,241 employs aluminium silicate, clay or kaolin. Austrian Pat. No. 291,934 employs clay or bauxite and modifies the process to obtain an aluminium fluoride with a low iron content. East German Pat. No. 86,172 uses clay hydrate. Swiss Pat. No. 246,251 uses clay, aluminium ores in general, and aluminium sulphate; the presence of $SO_4$ ions acts as a reaction catalyst and stabilizes the aluminium fluoride solution.

French Pat. No. 780,391 is of special interest. On heating aluminium fluosilicate it decomposes, yielding aluminium fluoride and silicon tetrafluoride gas as the reaction products. The gaseous silicon tetrafluoride is combined with hydrofluoric acid giving again fluosilicic acid which is reacted with an aluminous material and the cycle is repeated.

In the first reaction step of U.S. Pat. No. 3,175,882 a soluble aluminium salt is added as an adjuvant and introduces, as a modification in the process, a sudden cooling from 88°C to −71°C, before the silica is filtered. Furthermore, it achieves a cycle which overcomes the problem of pollution, producing cryolite with the crystallization mother liquors. In this patent adjustment of the process variables, especially temperature, should be complex and furthermore, at industrial scale, the cost of the aluminium fluoride obtained will be high, taking into account the use of adjuvants in the process.

U.S. Pat. No. 3,057,681, amongst other things, makes mention to a continous alumina metering time of 30 minutes, a digestion time of at least 2 hours and the use of fluosilicic acid with an F/Si atomic ratio of less than 6, as well as an economically unattractive concentration (8.5%) from an industrial point of view, and above all, securing that the reaction temperature does not exceed 60° to 70°C until the silica is filtered, represents a serious handicap. Due to the above mentioned facts, this process is industrially impracticable.

Finally, German Pat. No. 492,412 carries out the reaction of the fluosilicic acid and aluminous material in two steps. In the first step the aluminous material is dosified in defect, filtration is then effected and the silica is mixed with an excess of aluminous raw material. This process presents the disadvantage of having to recycle the second residue in order to obtain an acceptable yield.

All the cited patents, which obtain aluminium fluoride by reacting fluosilic acid with an aluminous material, have in common that concretely none of the cases deal with a continous process for obtaining aluminium fluoride. The object of our patent, as previously indicated, precisely refers to the obtention of this product by means of a continuous process whereby a considerable reduction in the volume of installations normally employed and, furthermore, a greater reaction yield, are obtained. Thus, for example, in a 15,000 metric ton production installation, the capital investment is approximately 25% less for a continuous installation, according to the method in question, than for a batchwise installation. This fact together with an improved reaction yield and a saving in maintenance costs, due to the reduced size of the installations, make this process of the utmost industrial interest.

The method proposed in our patent of obtaining aluminium fluoride from fluosilicic acid and an aluminous material, is also based on the reaction of the acid with the aluminous material, forming an insoluble silica hydrate and a solution of soluble $\alpha$-AlF$_3$.

The reaction can be expressed as follows:

$$H_2SiF_6 + 2\ Al(OH)_3 \quad 2\ AlF_3 + SiO_2 + 4\ H_2O$$

It is necessary to continuously separate the silica in such a way, or at such a time, so as to prevent conversion of soluble $\alpha$-AlF$_3$ into insoluble $\beta$-AlF$_3$ and so that a portion of the latter is retained by the silica. The silica formed must, therefore, be crystalline and easy to filter. On the other hand, the reaction between the fluosilicic acid and the aluminous material must be effected as nearly as possible to completion to avoid the loss of aluminum in the silica. Thus, the reaction must be effected within the shortest time of residence possible. It is, therefore, of utmost importance to determine the optimum reaction point, which is understood as being the time necessary to reach maximum solubility of the aluminum contained in the aluminous product. Said optimum point depends on the reaction temperature, fineness of the aluminous product, concentration of the fluosilicic acid and, in our case, the number of reactors employed. This optimum point should be determined for given working conditions, thus requiring a rigorous control of the process.

More specifically, the present invention relates to a continuous process for obtaining aluminum fluoride by reacting fluosilicic acid with an aluminous material, thus forming a suspension of insoluble silica hydrate and a supersaturated solution of $\alpha$-allotropic aluminum fluoride, which reaction is carried out by using fluosilicic acid having a concentration of 5 to 25% (preferably 16%), previously heated to approximately 60° to 95°C, and finely pulverized alumina or bauxite hydrate high in silica; the reaction mixture being maintained at a temperature above 90°C, or better still, the boiling point, for a reaction time from 5 to 60 minutes. An essential characteristic of the process is that it is carried out continuously in a battery of reactors arranged in cascade, the reaction being effected progressively from the first to the last reactor; the reaction flow being uniform; and the reactants being continuously introduced through the first reactor uniformly and continuously in such amount that the suspension emerging from the last reactor is maintained at a pH between 1 and 3, the insoluble silica hydrate being separated from said suspension which emerges from the last reactor, while said supersaturated $\alpha$-allotropic alumina fluoride solution obtained is lead to a battery of crystallizers, arranged in cascade, where the $\alpha$-aluminum fluoride is continuously converted to its insoluble $\beta$-allotropic state.

Concretely, the process is carried out according to the following steps:

Previously heated (60°–95°C) fluosilicic acid coming from the absorption system of the phosphoric or hydrofluoric acid plant, once the desired concentration has been adjusted, is fed to the first reactor of the reaction cascade. It is important that the feed is uniform and continuous.

The alumina hydrate is likewise, uniformly and continuously, fed to the first reactor.

The temperatures of the various reactors are adjusted to the preferred value, ranging from 80° to 100°C, by direct and/or indirect steam. The residence time of the starting materials in the reaction cascade is from 5 to 25 minutes, preferably 15 minutes, by modifying the flow rate of the fluosilicic acid. In fact, such residence time in each of the reactors is less than 5 minutes.

Adjustment of the final pH of the suspension, when emerging from the reaction cascade, is effected by modifying the alumina hydrate feed. It is not advisable, in practice, to modify the pH by modifying the flow rate of the fluosilic acid, since this would imply a variation in the average residence time in the reactors. Concretely, the pH of the suspension which emerges from the last reactor should be controlled between 1 and 3 the reagents can be added, in determined amounts, to any of the reactor cascades in order to adjust the pH rapidly.

The suspension coming from the reaction cascade is thereafter centrifugated, the silica being separated from the supersaturated AlF$_3$ solution. The silica cake can be washed in one or more stages.

Assuming that the silica cake is washed in various stages, the wash liquors can be recycled at the end of centrifugation to effect the first washes. The last wash of the cake is always carried out with clean warm water.

The washing cycle in various stages is as follows: clean warm water is used in the last stage of each cycle and the solution obtained will serve as the wash liquor in the penultimate stage of the following cycle and this, in turn, will serve as the wash liquor in the second-last stage of the subsequent cycle, and so on successively. Finally, the liquid from the first washing stage is added to the supersaturated $\alpha$-F$_3$Al.3H$_2$O solution.

The wash liquor and/or water can also be used to dilute and cool the suspension emerging from the reactor cascade before its centrifugation. This dilution and cooling is carried out in the centrifugal feed tank.

The previously heated and metered filtrate, together with the amount of wash liquor, equivalent to the water used in the latter wash, is continuously and uniformly fed to the first crystallizer of the cascade and of crystallizers.

The residence time in the crystallizer cascade ranges from 4 to 8 hours, preferably 6 hours.

The suspension of aluminium fluoride crystals, previously cooled is centrifugated or filtered, obtaining a mass of moist crystals of aluminium fluoride, which passes to the drying and calcination steps.

A previously metered portion of the suspension emerging from the crystallizer cascade is recycled, at the head of the crystallizer cascade.

The temperatures of the crystallizer cascade elements are maintained in a range from 80° to 100°C, preferably 90°C, adjusting the direct and/or indirect steam to each of the mentioned elements.

The crystallization mother liquors can be used to dilute the fluosilicic acid coming from the absorption system of the phosphoric acid plant, or they can be used for the $SiF_4$ up-take in said system.

From practice, it has been seen that the number of reactors or crystallizers can be from 2 to 6, and preferably 4. Each reactor may have its own controllable heating and agitating elements.

For a full understanding of the process of this invention, an explanation will now be made with reference to the attached drawing, wherein an installation is schematically shown in which the various enumerated parts correspond to the following items:

1. Aluminous material hopper.
2. Conveyor screw
3. Dosage scale
4. Conveyor screw
5. Fluosilicic acid tank
6. Fluosilicic acid concentration adjusting tank
7. Reactor cascade
8. Centrifuge
9. Wash liquor tank
10. Crystallizer battery
11. Centrifuge
12. Aluminium Fluoride solution tank
13. Heat exchanger
14. Heat exchanger
15. Alotropic aluminium fluoride cyrstal suspension tank
16. Aluminium fluoride cooling tank
17. $SiF_4$ up-take installation
18. Heat exchanger The aluminous material and preheated fluosilicic acid are continuously and uniformly fed to the first reactor of a cascade of reactors 7, in which they will remain for a suitable period of time so that the reaction yield is optimum (5–25 minutes). It is also important to check the temperature in the reactors so that it is maintained between 80° and 100°C.

A hydrated silica precipitate and a solution of aluminium fluoride in $\alpha$-alotropic (soluble) form will emerge from the last reactor, the silica being separated in the centrifuge 8.

The $SiO_2$ cake is then washed in a single or several stages according to the previously described steps.

A number of factors intervene in the reactor cascade, i.e. concentration of fluosilicic acid, pulverization degree of the aluminous material, temperature and residence time, which must be coordinated in such a way that an easily filtered silica hydrate crystallized precipitate and a solution of aluminium fluoride in its $\alpha$-alotropic form will be obtained.

Perhaps the most important of all these factors is the residence time. If it is short the acid and aluminous material will not fully react. On the other hand, if it is prolonged, the $\beta$-alotropic aluminium fluoride, which is insoluble, can precipitate and would, consequently, be retained with the silica cake. Logically, under these conditions, the yield of the reaction would be low.

The aluminium fluoride solution passes to one crystallizing battery 10 arranged in cascade, wherein a temperature of 80° to 100°C is maintained, and the residence time is of 4 to 8 hours. Under these optimal conditions $\alpha$-fluoride becomes $\beta$-fluoride which precipitates since it is insoluble.

The aluminium fluoride mass obtained in the continouos crystallizer is separated in the centrifuge 11 and is carried to the dryer-calcinator where a conventional process is undergone.

We claim:

1. Continuous process for obtaining aluminum fluoride by reacting fluosilicic acid with an aluminous material, forming a suspension of insoluble silica hydrate and a supersaturated solution of $\alpha$-allotropic aluminum fluoride, which reaction is carried out by using fluosilicic acid having a concentration of 5 to 25%, previously heated to approximately 60° to 95°C, and finely pulverized alumina or bauxite hydrate high in silica; the reaction mixture being maintained at a temperature above 90°C, for a reaction time from 5 to 60 minutes, the process being carried out continuously in a battery of reactors arranged in cascade, the reaction being effected progressively from the first to the last reactor; the reaction flow being uniform; and the reactants being continuously introduced through the first reactor uniformly and continuously in such amount that the suspension emerging from the last reactor is maintained at a pH between 1 and 3, the insoluble silica hydrate being separated from said suspension which emerges from the last reactor, while said supersaturated $\alpha$-allotropic aluminum fluoride solution obtained is lead to a battery of crystallizers, arranged in cascade, where the $\alpha$-aluminum fluoride is continuously converted to its insoluble $\beta$-allotropic state.

2. Continuous process for obtaining aluminum fluoride by reacting fluosilicic acid with an aluminous material, according to claim 1 characterized in that the number of reactors ranges between 2 and 6, each reactor having its own controllable heating and agitating elements.

3. Continuous process for obtaining aluminum fluoride by reacting fluosilicic acid with an aluminous material according to claim 1, characterized in that the residence time in each reactor is less than 5 minutes.

4. Continuous process for obtaining aluminum fluoride by reacting fluosilicic acid with an aluminous material according to claim 1, characterized in that said suspension is centrifuged and the silica cake of each centrifugation is washed in one or several stages.

5. Continuous process for obtaining aluminum fluoride by reacting fluosilicic acid with an aluminous material according to claim 1, characterized in that said suspension is diluted with pure water, with wash liquors or with a mixture of both.

6. A continuous process according to claim 1 wherein the fluosilicic acid or aluminous material is added to any one of the reactor cascades in determined amounts to adjust the pH rapidly.

7. A continuous process according to claim 1 wherein the fluosilicic acid has a concentration of 16%.

8. A continuous process according to claim 1 wherein the reaction time is 15 minutes.

9. A continuous process according to claim 2 wherein the number of crystallizers is 4, each crystallizer having its own controllable heating and agitating elements.

10. A continuous process according to claim 1 wherein the reaction is performed at the boiling point.

11. A continuous process according to claim 4 wherein when the washing is carried out in several stages, clean, warm water is used in the last stage and the solution thus obtained is used as the wash liquor for the penultimate step of a subsequent wash cycle and this, in turn, serves as the wash liquor for the second last step of a further subsequent wash cycle, and so on, successively until finally, the liquid coming from the first washing stage is added to said supersaturated solution of allotropic α-aluminum fluoride.

12. A continuous process according to claim 1 wherein the aluminous material is alumina or bauxite hydrate.

* * * * *